April 12, 1966  J. C. RABIER  3,246,221
SERVO CONTROLLED MAGNETIC PLATFORM
Filed Oct. 21, 1963
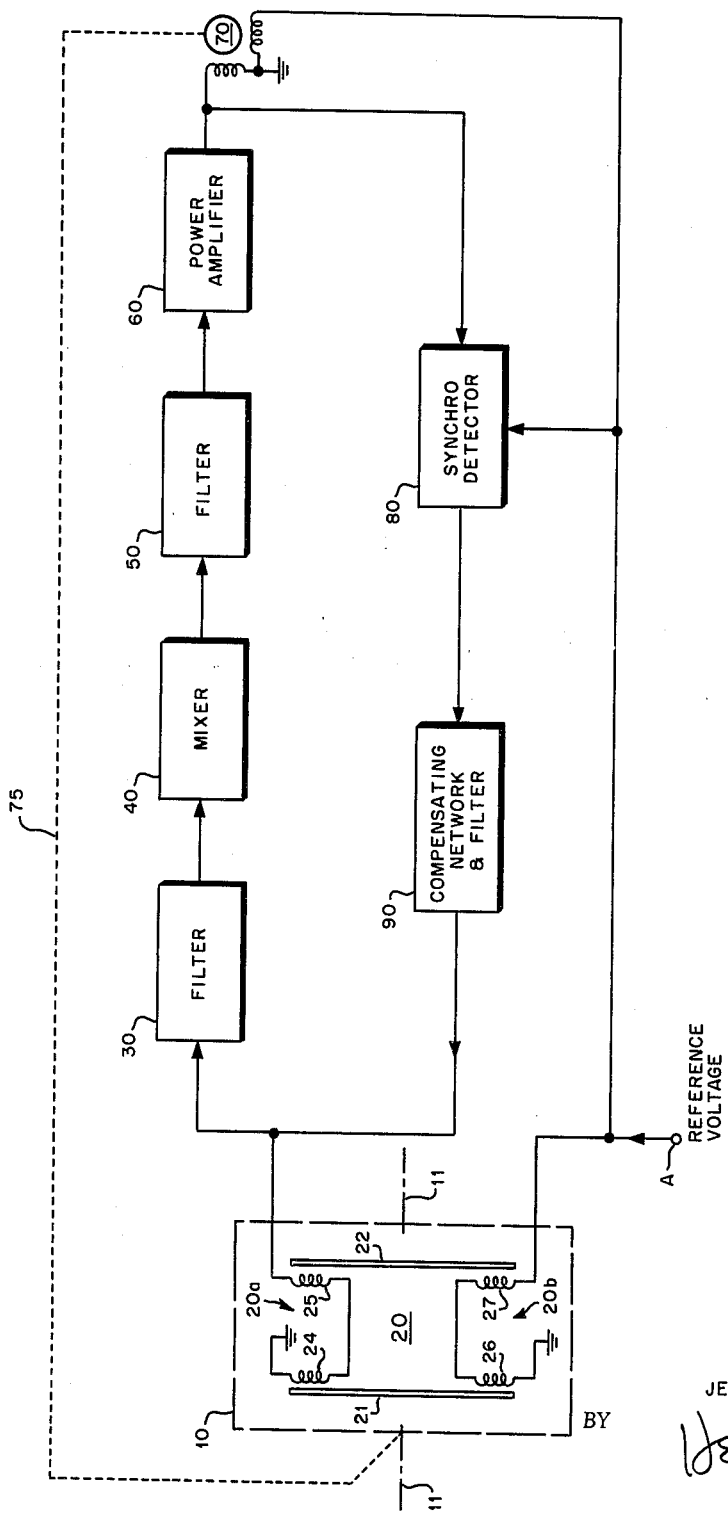
INVENTOR.
JEAN C. RABIER
BY
ATTORNEY

United States Patent Office 3,246,221
Patented Apr. 12, 1966

3,246,221
SERVO CONTROLLED MAGNETIC PLATFORM
Jean C. Rabier, Los Altos, Calif., assignor, by mesne assignments, to the United States of America as represented by the Secretary of the Navy
Filed Oct. 21, 1963, Ser. No. 317,851
7 Claims. (Cl. 318—28)

This invention relates to magnetic detection equipment and more particularly to a servo system for controlling a platform oriented perpendicularly to a magnetic field such as the earth's magnetic field.

Towed magnetic airborne detection equipment is presently utilized to indicate the presence of submerged or surface submarines. Systems employing such equipment are sufficiently sensitive so that such submarines may often be accurately tracked despite evasive tactics at relatively high speeds. Specifically, the equipment detects the magnetic field surrounding any submarine or vessel of steel construction, such a field may be weak or strong depending on the magnetic history of the vessel and its present position, but in any case that field is always much smaller than the magnetic field of the earth itself. The earth's magnetic field and the submarine's field are both present in the immediate vicinity of the submarine while at some distance the submarine's field becomes negligible and only the earth's field remains. Therefore, submarine detection depends on detecting the small disturbance in the normal earth's magnetic field that is caused by the weaker field of the submarine, the detection taking place as the aircraft flies along.

The equipment now in use comprises a detecting head which carries magnetometer coils which detect the magnetic field of a submarine, the magnetometer being mounted on a mica filled phenolic plate. The detector magnetometer is mounted so that it is perpendicular to the plate, consequently being parallel to the earth's magnetic field when the plate is properly oriented to be perpendicular to the earth's magnetic field.

The position of the mounting plate is controlled by servo motors which actuate the plate and the gimbals within which the plate is mounted. This is accomplished by the use of four orientor magnetometers which are mounted in the form of a square within the mounting plate. These magnetometers take the form of four strips, each strip with its own driving coil with each pair of strips controlling the servo action of one axis. For example, if the detector head is mounted on an aircraft in the direction of flight, then a first-axis pair of strips will be directed fore and aft and consequently will be called upon to compensate for rolls. The second-axis pair controls the servo motor action of the second axis which will be perpendicular to the direction of flight and will compensate for pitch maneuver. For each axis, the servo motor operates, when necessary, in such a direction as to maintain its pair of strips in the plate perpendicular to the earth's field and consequently in such a position as to keep the orientor strips in a zero field position. The result is that both pairs are at right angles to the earth's field. The signal obtained from the orientor magnetometer when the platform's orientation is not exactly perpendicular to the earth's magnetic field is a complex one and is used to control a converter amplifier for driving a servo motor reacting upon the magnetometer orientation.

The process of converting the magnetometer output signal to a voltage driving the servo motor is usually complex since the pick-up signal has a wide spectrum with high level or odd harmonics which does not carry the information mixed with a very low level or even harmonics which contain the information to be used for driving the servo motor. Also, the transfer function of the mechanical component of the servo system, that is, motor, gear boxes, platform, presents a phase lagging which requires a compensation for stabilization.

A common practice was to amplify the complex signal to compare positive peak to negative peak in order to obtain a data frequency signal. This data signal was connected through a compensating network to obtain lag and lead and finally used to drive a modulator. This output signal, which was also a suppressed carrier modulated signal, was amplified to drive the servo motor. All these operations required many stages and magnetic components. For example, in a typical equipment, nine tube amplifiers, four large transformers, and a filter were necessary; in another newer design, six tube amplifiers, three large transformers, and a 3-watt magnetic amplifier were used. This large number of magnetic components comprising the towed magnetic detection system resulted in the deleterious condition of high magnetic moment in addition to decreased reliability and increased cost and maintenance.

It is an object of the present invention to provide a simplified and reliable servo system for perpendicularly orienting a magnetic platform with respect to the earth's magnetic field.

Another object of the present invention is to provide a servo system of high stability performance for controlling a magnetic platform and to facilitate the development of a lightweight towed magnetometer system wherein the magnetic moment of all components located near the detecting head is greatly reduced.

A further object of the present invention is to provide an A.C. servo amplifier for use in maintaining a magnetic platform oriented perpendicularly to the earth's magnetic field thereby obtaining simplicity of design and the concomitant factor of reliability.

Various other objects and advantages will appear from the following description of an embodiment of the invention and the novel features will be particularly pointed out hereinafter in connection with the appended claims.

In the drawing:

The single figure is a block diagram of the servo controlled magnetic platform.

Referring now to the drawing, a platform generally noted at 10 is shown as rotatable about an axis 11 which is one axis of the two axes magnetic platform which in turn is a portion of a magnetic detecting head, not shown. In order to control the platform and keep it always perpendicular to the earth's magnetic field, two identical magnetometers are necessary and they are displaced on the same plane at right angles. Also, in the actual construction and organization of the detecting head, the platform 10 is pivoted about the axis 11 by reason of its engagement with a gimbal, not shown.

For the purpose of servo controlling the plate for platform 10, an orientor magnetometer generally noted at 20, is mounted within the plate 10. It is understood that an additional orientor magnetometer is utilized, however, in view of the identical nature thereof only one will be described. The magnetometer 20 comprises two substantially parallel cores 21 and 22 upon which coils 24, 25, 26 and 27 are arranged. The coils 24 and 25 are joined together at one end thereof with coil 24 having the other end thereof being grounded. Similarly, coils 26 and 27 are interconnected at one end thereof with the other end of coil 26 connected to ground, the other end of coil 27 being coupled to a source of alternating current indicated at A. This arrangement thereby forms a magnetometer 20 having an upper half 20a and a lower half designated at 20b. The servo amplifier is electrically energized by applying alternating current, in this case 450 cycles per second and 55 volts to terminal A which in turn is coupled to the other end of coil 27.

The system illustrated herein is further powered by a standard D.C. power source, not shown, in this case being 28 volts D.C.

The magnetometer 20 is driven into saturation by the 450 cycle fundamental frequency. If both halves of 20b detect the same amount of magnetic field, that is, amplitude, the upper half 20a will be exposed only to the fundamental (450 c.p.s) drive signals. This fundamental signal is coupled to the resistance-capacitor twin T filter 30 where it is shunted to ground.

However, if an unbalance occurs in 20b, that is if both halves fail to detect the same amount of magnetic field as a result of magnetometer misalignment with the magnetic field, a spectrum of even and odd harmonics of the drive frequency are coupled into 20a. This complex pick-up signal has the high level or odd harmonics which does not carry the information concerning the misorientation mixed with a very low level or even harmonics which contain the information to be used for driving the servo motor 70, the even harmonics being modulated by the magnetic field variations. All signals are coupled to the resistance-capacitor twin T filter 30. Filter 30 rejects the unbalanced fundamental frequency (450 c.p.s.) and lets the other components go through to the amplifier-mixer 40. This filter 30 further functions to partly compensate for the lag occurring in the following filters.

Amplifier-mixer 40 amplifies the predominate second (900 c.p.s.) and third (1350 c.p.s.) frequencies, the collector signal containing a large amount of these two components. Amplifier-mixer 40 reduces the complexity of the desired signal and the second (900) and third (1350) c.p.s. frequency plus the resultant beat note between these two components, 450 c.p.s., are delivered by the full wave mixer to a low pass high-reject filter 50 which eliminates these undesired strong harmonic components (900 and 1350 c.p.s.) and delivers the beat note between the input second and third harmonics.

This remaining resultant frequency (450 c.p.s.) is then coupled to the power amplifier 60 for amplification to a usable signal, the resultant output control frequency (450 c.p.s.) being coupled to the servo motor generally indicated at 70 for driving the same. The fixed phase or stator 71 of the servo motor 70 and the magnetometer drive 20b are connected to and driven from the same fixed source, that is, the A.C. voltage drive applied at A and is at 90° phase compared with the phase of the voltage driving the servo motor.

The output of the servo motor 70 is connected to the platform 10 by a mechanical link or feedback element 75 for the purpose of reorienting the platform to the desired position thereof perpendicular to the earth's magnetic field in response to the misorientation or error signal.

With high gain in a servo amplifier, a small misorientation of the platform would produce a large torque on the servo motor which would drive the platform rapidly toward its proper position. Mechanical inertia of the platform would carry it past the proper point, and the action would reverse itself, with the result that the gimbal might "hunt" or oscillate about the correct position. To prevent "hunting" it is imperative that the servo system apply to the platform a restraining torque as it approaches balance.

Due to the mechanical phase lag created in the electromechanical servo described above, it becomes necessary to devise a feedback network that will introduce the required lead-lag signal to the servo input to eliminate the "hunting" or oscillation of the servo platform described above. The feedback signal is derived by introducing a portion of the output signal from the power amplifier 60 into a phase detector or synchro detector generally indicated at 80. The output of the phase detector 80 is fed to the compensating network and filter indicated at 90 which provides the necessary phase shift so as to present the feedback signal 180° out of phase from signals presented to the twin T filter 30. The phase detector 80 is interconnected with the reference voltage applied at A which provides the reference signal for the dynamic feedback network.

This system uses the magnetometer as a modulator. It does not reduce the forward gain of the main amplifier and does not add harmonics on the motor signal as a compensating network will do if working on the carrier signal since once the fundamental frequency is rejected, the feedback signal contains only second and third harmonics which are the only ones necessary to ultimately drive the servo motor.

Obviously many modifications and variations of the present invention are possible in the light of the above teachings. It is therefore to be understood that within the scope of the appended claims, the invention may be practiced otherwise than as specifically described.

What is claimed is:

1. A system for servo controlling, with respect to the earth's magnetic field, the orientation of a magnetic platform having a magnetic detecting head thereon, comprising:

orientor magnetometer means mounted on the platform for providing a pick-up signal when the orientation of the platform is not exactly perpendicular to the earth's magnetic field, the pick-up signal having a wide spectrum with high level harmonics mixed with very low level harmonics, filter means for rejecting the unbalanced fundamental frequency and permitting the other components to pass through, amplifier-mixer means for amplifying said other components and mixing the same to deliver as an output a signal containing the beat frequency between said other components, low pass filter means for filtering the signal from said amplifier-mixer means, amplifier means for amplifying the remaining resultant signal from said low pass filter, servo motor means receiving the output from said amplifier means as an input to drive said servo motor means, and mechanical linkage means interconnected between said servo motor means and the platform for moving said platform in response to the misorientation thereof.

2. A system for servo controlling, with respect to the earth's magnetic field, the orientation of a magnetic platform having a magnetic detecting head thereon, comprising:

orientor magnetometer means mounted on the platform for providing a pick-up signal when the platform is not perpendicularly oriented to the earth's magnetic field, said pick-up signal having a wide spectrum with high level harmonics mixed with very low level harmonics, a source of alternating voltage, said alternating voltage being applied to said magnetometer means, filter means receiving the magnetometer means output as an input for rejecting the unbalanced fundamental frequency and permitting the other components to pass through, amplifier-mixer means for amplifying the second and third harmonics of said other components and for mixing said second and third harmonics to provide as an output a signal containing the beat frequency of said second and third harmonics, low pass filter means for eliminating all components except the beat frequency between second and third harmonics and providing the same as the output, power amplifier means for amplifying said output from said low pass filter, servo motor means receiving the output from said amplifier means as an input to drive said servo motor means, and mechanical linkage means interconnected between said servo motor means and the platform for moving the platform in response to the misorientation thereof.

3. A system for servo controlling, with respect to the earth's magnetic field, the orientation of a magnetic platform having a magnetic detecting head thereon, comprising:

orientor magnetometer means mounted on the platform for providing a pick-up signal when the platform is not perpendicularly oriented to the earth's magnetic field, said pick-up signal having a wide spectrum with high level harmonics mixed with very low level harmonics, a source of alternating voltage, said alternating voltage being applied to said magnetometer means, filter means receiving the magnetometer means output as an input for rejecting the unbalanced fundamental frequency and permitting the other components to pass through, amplifier-mixer means for amplifying the second and third harmonics of said other components and for mixing said second and third harmonics to provide as an output a signal containing the beat frequency of said second and third harmonics, low pass filter means for eliminating all components except the beat frequency between said second and third harmonics and providing the same as the output, power amplifier means for amplifying said output from said low pass filter, servo motor means receiving the output from said amplifier means as an input to drive said servo motor means, mechanical linkage means interconnected between said servo motor means and the platform for moving the platform in response to the misorientation thereof, and feedback network means electrically interconnected between the output of said power amplifier means and input to said filter means for introducing the required lead-lag signal to the servo input to eliminate oscillation of the platform.

4. The system of claim 3 wherein said feedback network means comprises:

phase detector means coupled to said power amplifier means and receiving as an input a portion of the output of said amplifier for detecting the phase of the same, and phase shifting means connected between the output of said phase detector means and the input to said filter means for presenting a feedback signal 180 degrees out of phase from the signal present to said filter by said magnetometer means.

5. A system for servo controlling, with respect to the earth's magnetic field, the orientation of a magnetic platform having a magnetic detecting head thereon comprising:

orientor magnetometer means mounted on the platform for providing an output signal when the platform is not perpendicularly oriented to the earth's magnetic field, said output signal having second and third harmonics, mixer means for mixing said second and third harmonics to provide as an output a signal containing the beat frequency of said second and third harmonics, power amplifier means for amplifying said output from said mixer means, servo motor means receiving the output from said amplifier means as an input to drive said servo motor means, and mechanical linkage means interconnected between said servo motor means and the platform for moving the platform in response to the misorientation thereof.

6. A system for servo controlling, with respect to the earth's magnetic field, the orientation of a magnetic platform having a magnetic detecting head thereon comprising:

orientor magnetometer means mounted on the platform for providing an output signal when the platform is not perpendicularly oriented to the earth's magnetic field, said output signal having second and third harmonics, mixer means for mixing said second and third harmonics to provide as an output a signal containing the beat frequency of said second and third harmonics, power amplifier means for amplifying said output from said mixer means, servo motor means receiving the output from said amplifier means as an input to drive said servo motor means, mechanical linkage means interconnected between said servo motor means and the platform for moving the platform in response to the misorientation thereof, and feedback network means electrically interconnected between the output of said power amplifier means and said magnetometer means for introducing the required lead-lag signal to the servo input to eliminate oscillation of the platform.

7. The system of claim 6 wherein said feedback network means comprises:

phase detector means coupled to said power amplifier means and receiving as an input a portion of the output of said amplifier for detecting the phase of the same, and phase shifting means connected between the output of said phase detector means and to said magneometer means for presenting a feedback signal 180 degrees out of phase from the signal presented by said magnetometer means.

No references cited.

JOHN F. COUCH, *Primary Examiner.*